Aug. 21, 1956 M. G. PAWLEY 2,760,132
REMOTE CONTROL SYSTEM USING PHASE DISPLACEMENT
Filed Oct. 5, 1945 3 Sheets-Sheet 1

Inventor
MYRON G. PAWLEY
By M. O. Hayes
Attorney

Inventor
MYRON G. PAWLEY
By M. O. Hayes
Attorney

Aug. 21, 1956 M. G. PAWLEY 2,760,132

REMOTE CONTROL SYSTEM USING PHASE DISPLACEMENT

Filed Oct. 5, 1945 3 Sheets-Sheet 3

Inventor

MYRON G. PAWLEY

By M. O. Hayes

Attorney

United States Patent Office 2,760,132

Patented Aug. 21, 1956

2,760,132

REMOTE CONTROL SYSTEM USING PHASE DISPLACEMENT

Myron G. Pawley, Alexandria, Va.

Application October 5, 1945, Serial No. 620,617

6 Claims. (Cl. 318—28)

(Granted under Title 35, U. S. Code (1952), sec. 266)

This invention relates to transmission systems and more particularly to a transmission system or control device, whose functioning depends on the phase displacement between recurrent waveforms.

It is an object of the invention to provide a transmission system comprising transmitter means and receiver means, the receiver means being capable of supplying power output dependent on the phase relation between two recurrent waveforms.

It is another object of the invention to provide a transmission system in which the receiver means becomes operative at a given phase position on a given wave to supply a power output dependent on the relative phase of another wave.

It is another object to provide a transmission system whose power output can be employed by servo means to rotate a shaft.

It is another object of the invention to provide a control device operative to position a remote member in correspondence to the motion of a transmitter member either continuously or in discrete steps.

It is another object of the invention to provide means of positioning a multiplicity of remote members in correspondence with the motion of a multiplicity of transmitter members.

It is another object of the invention to provide a transmission system having transmitter means and receiver means, the receiver means being operative to supply an output voltage dependent on the phase of a sine wave relative to a series of regularly recurrent pulses.

It is another object of the invention to provide a means of frequency division which insures a good phase lock.

The invention will be further understood with reference to the exemplary embodiment shown in the drawing in which.

Figure 3:
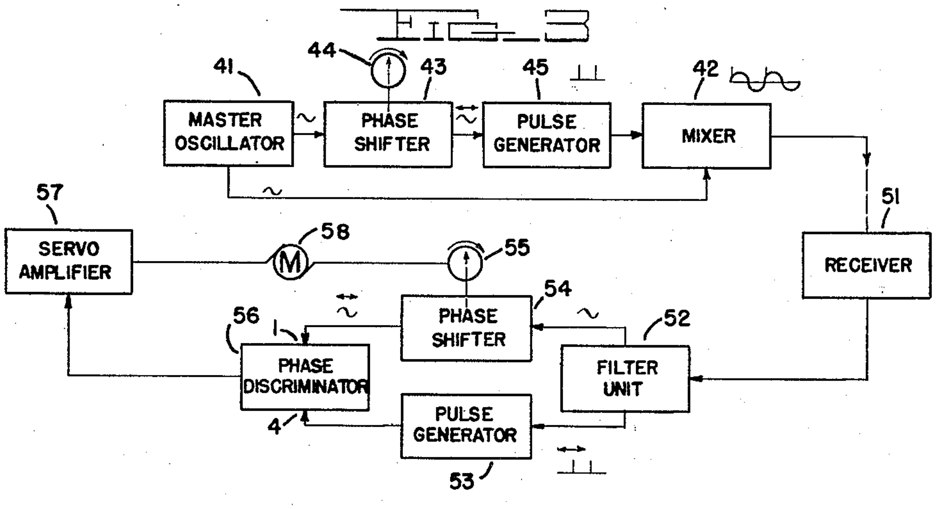
Fig. 3 shows in block diagram an embodiment of the invention in which a sine wave with superimposed pulses is transmitted from the transmitter to the receiver unit.
Figure 4:
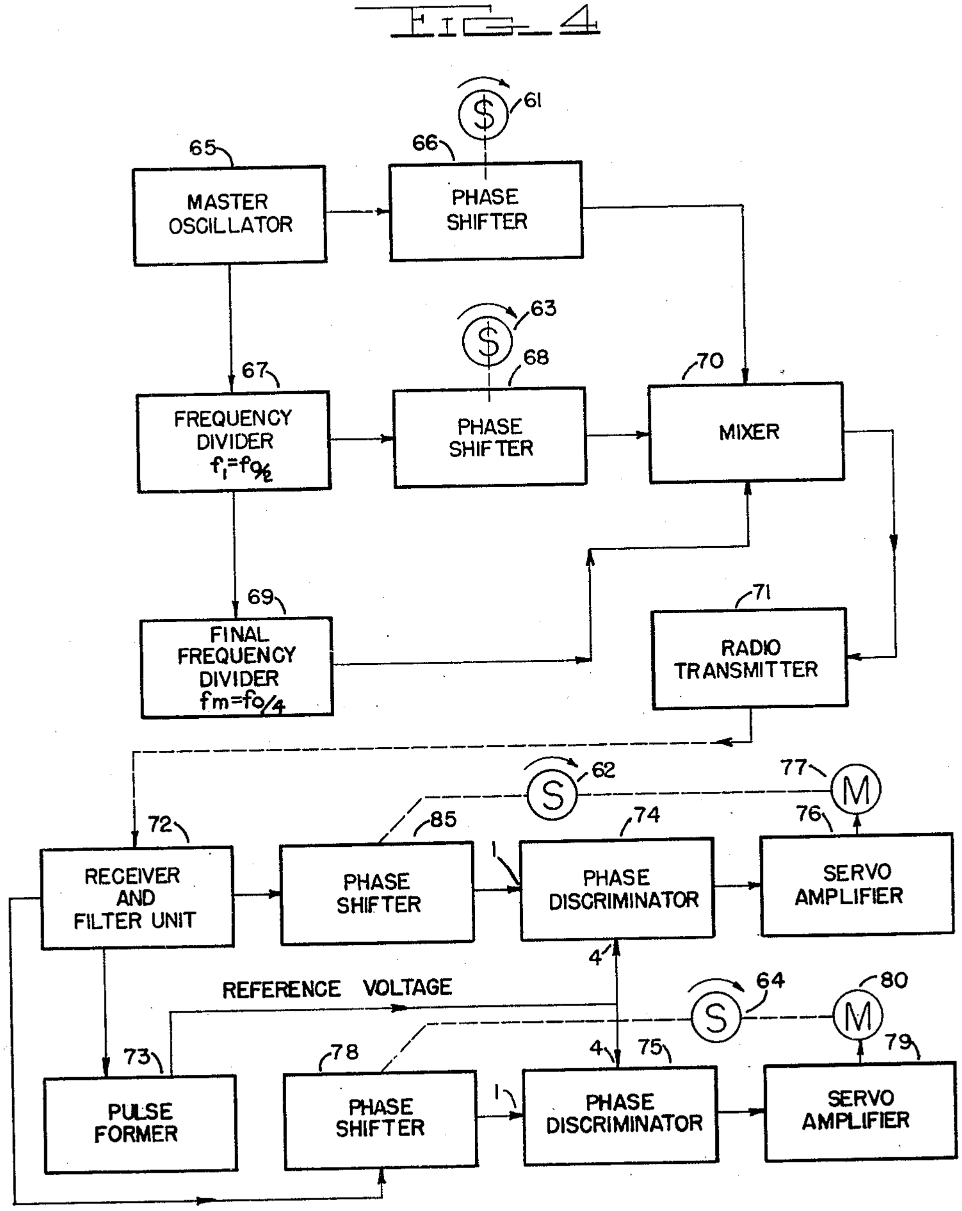
Fig. 4 shows in block diagram a two channel transmission system employing waveforms of harmonically related frequencies.

The embodiments of the invention in Figs. 3 and 4 represent transmission systems which supply a voltage output dependent on the phase displacement of one recurrent waveform in relation to another. In the particular cases shown, this voltage is employed by servo means to position a remote member or rotate a shaft. However, it is conceivable that it have other applications, such as the transmission of intelligence, for example.

In either system the transmitter circuit includes a source of two or more recurrent wave forms. The phase of one waveform is shifted relative to another. The waveforms are then mixed and transmitted by suitable means to the receiver.

The receiver recovers the separate waveforms and applies them to a discriminator, which supplies a voltage dependent on their phase relation.

The intelligence of the phase difference may be brought to the discriminator in one of two ways. In the embodiment shown in Fig. 3 one output of the sine wave oscillator is passed through the transmitter phase shifter and the other output, no frequency division being necessary, is used as a reference voltage. One of the two voltages is squared and differentiated to form pulses. The pulsed voltage is mixed with the sine voltage and carried to a receiver either over a two wire line or by modulated carrier wave. The receiver and filter means separate the sine wave from the pulsed wave. The two wave forms are then fed to the discriminator, the sine wave passing first through the receiver phase shifter.

In the means shown in Fig. 4 the output of a sine wave oscillator is frequency divided giving a subharmonic as a reference voltage. The fundamental is passed through a phase shifter whose position depends on the rotational position of a transmitter shaft. The two waves are mixed by appropriate means and passed over a two wire line to a receiver or are used to modulate a carrier wave and transmitted to the receiver by radio means. The signal is recovered and the two waves separated by receiver and filtering means. The lower frequency is squared and differentiated to form pulses and fed to the pulse input of the discriminator. The other wave is passed through a receiver phase shifter attached to the receiver shaft and fed to another input of the discriminator. The voltage output of the discriminator depends on the phase of the sine wave relative to the pulses.

In this method it is necessary to get a good phase lock between the fundamental and subharmonic frequencies, a feature not attained in prior art devices.

Possible applications of the invention are the transmission of intelligence and the positioning of dials, shafts, or P. P. I. yokes in relay radar systems, telemetering, teletype, remote switching, and similar devices. It is to be understood that the scope of the invention is not to be limited to specific embodiments or applications and that reference to specific devices is for the purpose of illustration only.

The operation of the transmission system will be better understood if the phase discriminator, described in my co-pending patent application, Serial No. 619,009, filed September 27, 1945, is first explained.

It provides a means of obtaining an error voltage due to the phase difference of two recurrent wave forms. The case in which the discrimination is between a sine wave and a series of regularly recurring pulses whose repetition frequency equals the sine wave frequency will first be considered.

Figure 1:
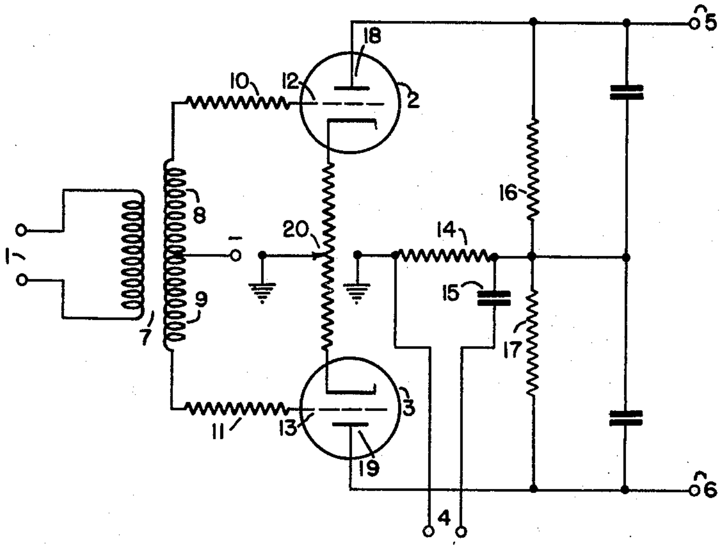
Fig. 1 shows in circuit diagram a phase discriminator capable of producing an output dependent on the phase of a recurrent waveform relative to a series of uniformly spaced pulses.

Referring now to Fig. 1, the sine wave is introduced at input 1 and applied to the grids of amplifier tubes 2 and 3 connected in push pull. The pulses are introduced at input 4 and are the only source of plate supply for the amplifiers. The output error voltage is taken across terminals 5 and 6.

The sine wave input at 1 is stepped up by transformer 7 inducing voltages across the secondary half sections 8 and 9 of equal amplitude and opposite polarity. The voltages across 8 and 9 are fed through grid limiting resistors 10 and 11 to the grids 12 and 13 of the amplifiers 2 and 3. The polarity of the voltage at grid 12 will be opposite to that at grid 13.

The pulse input at 4 is coupled across resistor 14 through condenser 15. It is fed in parallel through load resistors 16 and 17 to the plates 18 and 19 of the amplifiers. Since this input is the only source of plate supply for the tubes they can conduct only for the duration of each pulse applied to the plates. The condition of conduction in the two amplifiers will then depend on the grid voltage present at the time of the appearance of each pulse.

If the phase relation is such that a pulse is applied to the plates, at the instant the input sine wave is zero, both tubes should conduct equally, giving no error voltage output. To balance the conduction in the two tubes, the sine wave voltage can be removed from input 1, and the pulses applied at 4. Potentiometer contact 20 is then moved until the error voltage output is zero.

I shall first assume that the sine input at 1 is of such phase at the time a pulse is applied to the plates of the amplifier that grid 12 will be positive and grid 13 negative relative to steady bias. Tube 2 will conduct more heavily than tube 3 causing plate 18 to have a lower potential than plate 19. This results in a negative output at terminal 5 relative to terminal 6.

In like manner, if the voltage at grid 12 is negative at the time a pulse is applied to the plates, a positive output results.

Figure 2:
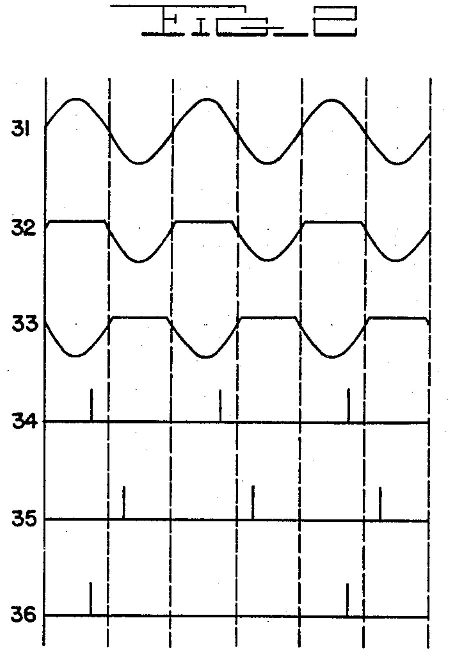
Fig. 2 shows waveforms occurring during operation of the circuit of Fig. 1.

The results described will be more apparent by referring to the waveforms in Fig. 2. The input at 1 (Fig. 1) is represented by waveform 31. The waveforms at grids 12 and 13 are represented by 32 and 33 respectively. The pulses applied to the plates for one phase relation are represented by waveform 34. It will be noted that each of these pulses occur at a time when voltage wave 32 is positive and 33 negative. Grid 12 is then positive and grid 13 negative relative to steady bias. The greater conduction of tube 2 than tube 3 results in a negative error signal.

Waveform 35 shows the pulses applied to both plates in another phase relation to the sine wave input. In this case the pulses occur while waveform 32 at the grid 12 is negative and waveform 33 at the grid 13 is positive relative to average bias. Tube 3 conducts more current than tube 2 with a resultant positive error output signal.

Waveform 36 is a pulsed wave whose repetition frequency is the first subharmonic of the input sine wave 31. It is evident that the discriminator will also function in this case, for although successive pulses occur only on every other cycle of the sine wave they always occur in the same phase relation to the cycles during which they appear.

For the discriminator to function properly the pulses introduced at 4 should be of high and uniform amplitude. In a system where the pulses applied to the discriminator tend to be weak or irregular, these pulses are used to trigger a local pulse generator. The uniform high voltage pulses from the generator are then fed to the discriminator.

In the receiver units in Figs. 3 or 4, the sine wave output sent to input 1 (Fig. 1) of the discriminator is amplified sufficiently to overdrive the tubes 2 and 3. This will cause a small change in phase near the in-phase position to cause a large change in output signal. The receiver shaft will then more closely follow the motion of the transmitter shaft.

Refer now to the block diagram of Fig. 3, which portrays an embodiment of the invention in which sine waves and pulses are transmitted. A sine wave oscillator 41 generates a low frequency wave, a preferred frequency being about 500 C. P. S. The output is fed directly to the mixer 42 and also through the phase shifter 43, a type for which phase shift is proportional to angular position of the shaft 44. The phase shifted wave is passed to a pulse generator 45, producing 1 micro-sec pulses of high voltage. The pulse generator 45 may comprise squaring and differentiating circuits and a local pulse generator as described in detail on page 178 of the text "Ultra High Frequency Techniques" by Brainerd, Koehler, Reich and Woodruff; Van Nostrand Inc., 1942.

The pulses are combined in the mixer 42 with the sine wave voltage and the resultant wave is transmitted on a two wire line or its used to modulate a radio carrier wave.

In this exemplary embodiment, the signal is demodulated in the receiver 51 and then passed to a filter unit 52 where the sine wave is separated from the pulses typically by conventional high and low pass filters feeding the pulse generator 53 and phase shifter 54 respectively. The low pass section of filter 52 adapted to pass the sine wave would be designed to pass the selected sine wave frequency and sharply attenuate all higher frequencies. Such a low pass filter and the design considerations involved are shown on page 32 of "Ultra High Frequency Techniques" by Brainerd, Koehler, Reich and Woodruff. At page 33 of the same text a suitable high pass filter is described which may be used to effectively pass the pulsed signal components and reject the sine wave frequency. Inasmuch as the repetition rate of the pulsed signal is equal to the sine wave frequency, a finite amount of pulse energy would pass through the low pass filter to the phase shifter 54, but because of the low power content of this component it would have negligible effect on the selected sine wave signal. Furthermore, and since the sine wave signal is applied in a balanced manner to the grids 12 and 13 of the phase detector (Fig. 1) the presence or absence of a pulse on the push-pull sine wave applied to the detector of Fig. 1 will not materially affect the operation of the phase detector, since this pulse will be effectively cancelled in the plate circuit of the detector. In like manner, the elimination of this component by the high pass filter would not disturb the circuit operation since the output of filter 52 feeding the pulse generator 53 is simply used to trigger the pulse generator 53 which reshapes this energy with a pulse suitable for application to the phase discriminator 56. The pulse energy output from filter 52 triggers a blocked grid pulse generator 53 which produces a short duration high voltage pulse for each trigger. Pulse generator 53 may be of the type shown and described on pages 176 and 177 of "Ultra High Frequency Techniques" referred to above. The reference sine wave passes through the phase shifter 54, geared to the shaft 55 to be moved. The pulses and reference sine wave are applied to the phase discriminator 56 which generates an error voltage depending on the phase difference of the two wave forms, the sine wave being applied to input 1 and the pulse to input 4. This error voltage is fed to a servo amplifier 57 which applies power to the motor 58 in such a manner as to drive the shaft 55 in the same direction as the original shaft 44 was moved. The servo amplifier 57 and motor 58 may be of the type shown in detail in the U. S. Patent No. 2,256,487 to Moseley et al. in Figure 2*b* as amplifier 66, 60 and motor 23. The shaft 55 will move until it is in a rotational position corresponding to that of shaft 44, at which time there will be no error voltage from the discriminator and hence no shaft motion.

Suppose, for example, the transmitter shaft 44 and receiver shaft 55 are so oriented that the phase shifters are in the position corresponding to 90° phase shift relative to the master oscillator sine wave output. If the transmitter shaft 44 is now turned 2° clockwise the phase of the sine wave in the phase shifter 43 channel will be shifted 2° more and each pulse produced will be 92° ahead of the reference sine wave in the other channel. The output of the mixer 42 will be a sine wave with pulses superimposed at 92° on each cycle. This will be transmitted to the receiver means, where the reference sine wave will be directed to the phase shifter 54 channel; and the pulses, each stepped up 92°, will trigger the pulse generator 53 to form uniform high voltage pulses. The reference sine wave will be shifted 90° by the phase shifter 54 since this phase shifter was originally in the 90° position leaving momentarily a 2° difference in phase between the sine wave output of the phase shifter 54 relative to the pulses. The phase discriminator will produce an error voltage depending on this 2° error, which is fed to the servo amplifier and causes the motor to turn. The shaft will be turned by the motor until the receiver phase shifter is in the 92° position, at which time the pulses and the sine wave entering the discriminator will be in the same phase and no error voltage will result. Actually, the servo amplifier responds so rapidly to such small error voltages that accurate continuous following is obtained.

In the exemplary control system illustrated by Fig. 4, two remote shafts are positioned to correspondence with two transmitter shafts. Shaft 61 controls the motion of shaft 62 and shaft 63 controls the motion of shaft 64.

A master oscillator 65 in the transmitter unit generates a sine wave of frequency *fo*. The sine wave *fo* passes through phase shifter 66, which is mechanically coupled to shaft 61. The phase shifter 66 shifts the phase of the sine wave an amount proportional to the angular rotation of the shaft 61. One complete rotation of the shaft produces a 360° phase shift.

Another output *fo* of the oscillator 65 is fed to frequency divider 67, which supplies a sine wave frequency of *fo*/2. This wave is passed through phase shifter 68 and its phase is displaced an amount depending on the rotational position of shaft 63.

The wave *fo*/2 is also fed from divider 67 to frequency divider 69, which supplies a wave of frequency *fo*/4, which is used as a reference voltage.

The outputs of phase shifters 66 and 68 and frequency divider 69 are mixed in mixer 70. The output of the mixer is used to modulate a radio frequency carrier in radio transmitter 71 and radiated to the receiver.

The output of the mixer in some applications is conducted to a suitable receiver by a two wire cable.

In the receiver and filter unit 72, the three wave forms of frequencies *fo*, *fo*/2 and *fo*/4 are recovered from the carrier and filtered into discrete channels. The reference wave *fo*/4 is fed to pulse former 73, whose output is a series of short high voltage pulses, comprising one pulse for each cycle of the sine wave. This series of pulses becomes the reference voltage in phase discriminators 74 and 75 at input 4 (see Fig. 1).

Pulse former 73 ordinarily comprises squaring and differencing circuits and a uniform pulse generator.

The sine wave output *fo* of unit 72 passes through phase shifter 85 to input 1 of discriminator 74. Discriminator 74 takes the same form as that shown in Fig. 1. Phase shifter 85 is mechanically coupled to shaft 62, so that the phase shift of *fo* depends on the rotational position of shaft 62.

The discriminator 74 will supply a voltage output dependent on the time of occurrence of the pulses of frequency *fo*/4 applied at input 4 relative to the phase of the sine wave *fo* appearing at input 1. Although successive pulses of frequency *fo*/4 occur only during every fourth cycle of the sine wave of frequency *fo*, as explained with reference to wave form 36 of Fig. 2, the pulses always occur in the same phase relation to the cycles of the sine wave *fo* during which they appear. Thus the discriminator will function properly. The voltage output of discriminator 74 drives servo amplifier 76, which energizes motor 77. Motor 77 drives shaft 62 to correspondence with transmitter shaft 61.

By known engineering means, the system is so geared mechanically and wired electrically that shaft 62 is driven in the same direction that shaft 61 is moved. When shaft 62 is in the same rotational position as shaft 61, there will be no voltage output from the discriminator 74 and no motion of shaft 62.

In like manner sine wave *fo*/2 passes through phase shifter 78 to input 1 of discriminator 75 where it is compared with the reference pulses *fo*/4. As explained with reference to waveform 36 of Fig. 2 the pulses always occur in the same phase relation to the cycles of the sine wave *fo*/2 during which they appear. The output of discriminator 75 is employed by servo amplifier 79 and motor 80 to drive shaft 64 to correspondence with shaft 63.

A control for the rotation of only one shaft would not include frequency divider 69 phase shifter 68 or shaft 63 in the transmitter. The output of frequency divider 67, *fo*/2, would be applied directly to the mixer and would be the reference voltage.

In the receiver, phase shifter 78, discriminator 75, amplifier 79, motor 80 and shaft 64 would be eliminated.

To adapt the system of Fig. 4 to the rotation of more than two remote shafts other frequency dividers would be added to the transmitter unit with their associated shafts and phase shifters. The lowest subharmonic would be the reference voltage and be applied directly to mixer 70. In the transmitter additional corresponding phase shifters, discriminators, and servo control systems would be added.

Frequencies used in the system might be 2000, 1000, 500, and 250 C. P. S. To more fully utilize the spectrum, another master oscillator might be employed supplying frequencies in between these values of say 1500, 750, 325 and 162.5 C. P. S.

Other systems attempting to rotate shafts by transmitting a fundamental frequency and subharmonics thereof failed due to inability to get a good phase lock between the fundamental and sub-harmonic frequencies. My method of frequency division, a description of which follows, accomplishes a good phase lock.

Figure 5:
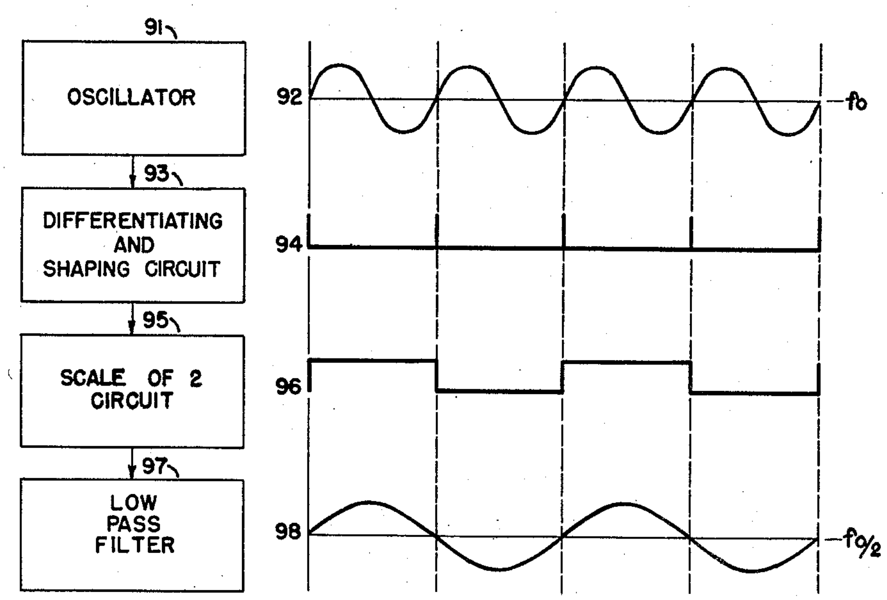
Fig. 5 illustrates a means of frequency division with good phase lock.

In Fig. 5, there is shown a detailed block diagram, together with associated voltage waveforms, of a preferred form of frequency divider to be used with the system illustrated in Fig. 4. A master oscillator 91, analogous to oscillator 65 of Fig. 4, provides an output represented by the sine wave 92. The sine wave is fed to a squaring and differentiating circuit 93 to produce pulses shown in waveform 94, which trigger a "scale of 2" circuit 95 whose output is a square wave 96 of half the original frequency. The "scale of 2" circuit 95 may be a conventional Eccles-Jordan trigger circuit such as is shown and described on page 174 of the text "Ultra High Frequency Techniques" cited above. In addition, details for suitable squaring and differentiating circuits for application in circuit 93 may be found on page 178 and 179 of the same text. After passing through the filter 97, the wave becomes essentially a sine wave 98. Due to the fact that the square wave 96 does not include the second harmonic in its composition, adequate filtering is simplified.

It will be understood that the specific embodiments described above are exemplary only, and that the scope of the invention will be determined with reference to the appended claims.

The invention described herein may be manufactured and used by or for the Government of the United States of America for governmental purposes without the payment of any royalty thereon or therefor.

What is claimed is:

1. A transmission system comprising transmitter means and receiver means, said receiver means being adapted to receive transmissions from said transmitter means the transmitter means comprising a source of two recurrent waveforms having the same frequency, one of said waveforms having a greater rate of change of amplitude than the other, and means shifting the phase of one waveform relative to the other, and the receiver means including a power source whose displacement output depends on the relative phase of the two waveforms.

2. A transmission system comprising a source of two sine waves of harmonically related frequencies, means shifting the phase of the waveform of higher harmonic frequency relative to zero phase of the other waveform, pulse forming means for generating from the waveform of lower frequency a series of narrow pulses having a constant phase relationship with said higher frequency harmonic, a voltage generating means, means for applying said phase shifted higher harmonic frequency wave form and said pulses to said voltage generating means, said generating means being operative in response to the relative phase of said pulses and said higher frequency harmonic to develop a voltage having a polarity and magnitude proportional to said relative phase.

3. A system for positioning a remote member comprising transmitter means and receiver means; the transmitter means comprising a means supplying a sine wave to two discrete channels, a transmission member, a phase shifter in one channel attached to the transmission member operative to shift the phase of the sine wave as the member is rotated, a frequency divider circuit in the other channel operative to produce the first subharmonic frequency of the oscillator output, mixer means combining the phase shifted sine wave and the first subharmonic, means for transmitting the intelligence contained in the mixed sine wave and first subharmonic to the receiver; the receiver means comprising means demodulating the received signal, filter separating the sine wave from its first subharmonic, shaping means operative to form a relatively narrow pulse for each cycle of the subharmonic and bearing a constant phase relationship with each cycle of the subharmonic, phase shifter means mechanically coupled to the remote member to be positioned, operative to shift the phase of the fundamental frequency sine wave, discriminator means operative to generate an error voltage due to the phase difference between the sine wave and the subharmonic pulses, and servo means employing the error voltage to position the remote member to correspondence with the transmitter member.

4. System for positioning each of a multiplicity of remote members to correspondence with a respective reference member, comprising in combination, a sine wave generator, a multiplicity of frequency dividers to produce successive subharmonics bearing a fixed phase rotation with the fundamental frequency, a plurality of phase shifters each operatively connected to one of said reference members, means feeding said fundamental and each subharmonic thereof except the lowest to one of said phase shifters whereby its phase is shifted in accordance with the motion of one of said reference members, mixer means combining the lowest subharmonic with the phase shifted waves, means for transmitting the intelligence contained in the mixer output to a remote station, receiver and filter means for separating out the various sine waves, a plurality of phase shifters each operatively coupled to one of the remote members to be positioned, means feeding each wave except the lowest subharmonic through a respective one of said last named phase shifters, means producing a pulsed waveform from each cycle of the wave of the lowest subharmonic frequency a relatively narrow voltage pulse bearing a constant phase relation with said wave of lowest subharmonic frequency, a multiplicity of discriminator means each operative to produce an error voltage due to the phase displacement of each sine wave with respect to the pulsed wave, and a multiplicity of servo means each employing one of said error voltages to move one of the remote members.

5. Means for positioning a remote member comprising in combination, a sine wave generator having two output channels, a transmission member, a phase shifting means in one of said channels, said phase shifting means being mechanically coupled to said transmission member, means forming a series of uniformly spaced pulses from one of the waves, means mixing the sine wave and pulses, means for transmitting the signal from the mixer to a remote station, receiver means separating out the sine wave from the pulsed wave, phase shifting means receiving the sine wave, the phase shifting means being mechanically coupled to the remote member to be positioned, means deriving an error signal dependent on the phase displacement of the sine wave with respect to the pulsed wave, and servo means employing said error voltage to position said remote member in correspondence with the transmission member.

6. System for positioning each of a multiplicity of remote members to correspondence with a respective reference member; comprising in combination; a sine wave generator; a multiplicity of frequency dividers to produce subharmonics of the fundamental frequency; each of said frequency dividers comprising means forming pulses from a sine wave input, means employing the pulses to obtain a square wave of half the frequency of the sine wave input, and filter means operative on the square wave to supply an output that is essentially a sine wave of half the frequency of the sine wave input; a plurality of phase shifters each operatively connected to one of said reference members; means feeding said fundamental and each subharmonic thereof except the lowest to one of said phase shifters whereby its phase is shifted in accordance with the motion of one of said reference members; mixer means combining the lowest subharmonic with the phase shifted waves; means for transmitting the intelligence contained in the mixer output to a remote station; receiver and filter means for separating out the various sine waves; a plurality of phase shifters each operatively coupled to one of the remote members to be positioned; means feeding each wave except the lowest subharmonic through a respective one of said last named phase shifters; means producing a pulsed waveform from the wave of lowest subharmonic frequency; a multiplicity of discriminator means each operative to produce an error voltage due to the phase displacement of each sine wave with respect to the pulse wave; and a multiplicity of servo means each employing one of said error voltages to move one of the remote members.

References Cited in the file of this patent

UNITED STATES PATENTS

| | | |
|---|---|---|
| 2,039,405 | Green et al. | May 5, 1936 |
| 2,183,725 | Seeley | Dec. 19, 1939 |
| 2,256,487 | Moseley et al. | Sept. 23, 1941 |
| 2,340,376 | Grandstaff | Feb. 1, 1944 |
| 2,376,527 | Wills | May 22, 1945 |
| 2,429,636 | McCoy | Oct. 28, 1947 |
| 2,582,957 | Borsum | Jan. 22, 1952 |